United States Patent [19]
Strubbe

[11] Patent Number: 5,970,802
[45] Date of Patent: Oct. 26, 1999

[54] RELATING TO MASS FLOW MEASURING APPARATUSES

[75] Inventor: Gilbert J. I. Strubbe, Loppem, Belgium

[73] Assignee: New Holland North America, Inc., New Holland, Pa.

[21] Appl. No.: 09/074,102

[22] Filed: May 7, 1998

[30] Foreign Application Priority Data

May 7, 1997 [GB] United Kingdom .................. 9709270

[51] Int. Cl.$^6$ ................................ G01F 1/30; G01F 1/28
[52] U.S. Cl. ................................ 73/861.73; 73/861.71; 73/861.74
[58] Field of Search ............................ 73/861.71, 861.72, 73/861.73, 861.74, 867.391, 867.451

[56] References Cited

U.S. PATENT DOCUMENTS

| | | | |
|---|---|---|---|
| 4,067,238 | 1/1978 | Oetiker | 73/861.73 |
| 4,069,709 | 1/1978 | Volk et al. | 73/861.73 |
| 4,538,471 | 9/1985 | Volk, Jr. et al. | 73/861.73 |
| 4,543,835 | 10/1985 | Volk, Jr. et al. | 73/861.73 |
| 4,955,270 | 9/1990 | Volk, Jr. | 73/861.73 |
| 5,065,632 | 11/1991 | Reuter | 73/861.73 |
| 5,495,773 | 3/1996 | Olesen | 73/861.73 |
| 5,752,545 | 5/1998 | Vienneau et al. | 73/861.73 |

*Primary Examiner*—George Dombroske
*Assistant Examiner*—Robin Clark
*Attorney, Agent, or Firm*—J. William Stader; Larry W. Miller; Frank A. Seemar

[57] ABSTRACT

In the field of mass flow measuring apparatuses, it is known to provide a sensor member for the establishment thereon of streamline flow of bulk material, in which the sensor member design is optimised in order to minimise the effects of changes in the coefficient of friction between the bulk material and the sensor member.

The invention relates to improvements in the construction of the measuring apparatus, whereby two mechanical quantities (such as a pair of forces; or a pair of moments) may be measured to provide additional data on the flow process. In particular, it is possible to determine an exit velocity value $v_e$ that is indicative of the momentum of bulk material in the sensor member.

34 Claims, 6 Drawing Sheets

RELATING TO MASS FLOW MEASURING APPARATUSES

BACKGROUND OF THE INVENTION

1. Field of Invention

This invention relates to improvements in or relating to mass flow measuring devices. In particular, the invention relates to improvements in such devices in which streamline flow ("bulk flow") of bulk material is established on a sensor member. Such apparatuses are of particular use in vehicles such as combine harvesters and forage harvesters. In such vehicles it is desirable to provide data on the mass flow rate of grains of crop passing between the grain elevator and the bubble up auger for temporary storage in the grain tank of the vehicle.

2. Description of Prior Art

Mass flow measuring devices are also employed in stationary installations such as hoppers, silos, conveying machinery, and various kinds of manufacturing and medical apparatuses.

Bulk flow may embrace the flow of bulk grain and chemicals in transport vehicles; the flow of powders and of materials of larger particle size such as fruit, vegetables, coal, minerals and ores; and even the flow of liquids of high viscosity. In general terms, bulk flow of material may be regarded as any flow of matter in contact with a surface, in which the effects of friction between the surface and the material usually influence the maximum flow rate, and in which the matter exhibits free flow behaviour.

Our co-pending U.S. patent application Ser. Nos. 09/005,094 and 09/005,095 disclose sensor members for use in bulk flow measuring apparatuses, in which one or more manufacturing parameters of the sensor members are optimised in order to minimise the effects, on the measured flow rates, of changes in the coefficient of friction between the bulk material and a sensor surface. Such optimisation of manufacturing parameters is of particular benefit in harvesting machinery and crop conveyors, since some characteristics (such as the moisture content) of the bulk material can vary over time, for example during harvesting operations.

Although the apparatuses in application Ser. Nos. of 09/005,094 and 09/005,095 represent significant improvements in the field of mass flow measurement, the inventor has surprisingly discovered that it is possible to make further improvements in mass flow measurement apparatuses.

Broadly stated, the invention relates to apparatuses and methods for measuring two measurable quantities resulting from bulk flow on a sensor member, and deriving from the measured values one or more characteristics of the flow, such characteristics being optionally either independent of or dependent on changes in the coefficient of friction between the bulk material and the sensor surface.

SUMMARY OF THE INVENTION

Thus, according to a first aspect of the invention there is provided a mass flow measuring apparatus comprising a sensor member including a surface for establishment thereon of streamline flow of bulk material; characterised in that the apparatus includes one or more transducers for measuring two or more measurable quantities resulting from forces acting on the sensor member said forces comprising the force resulting from said streamline flow on the sensor; and a processor for deriving from the transducer outputs one or more characteristics of the flow of bulk material on the surface, said one or more characteristics being optionally substantially independent on the coefficient of friction between the bulk material and the surface; or dependent thereon.

This apparatus advantageously permits the generation of a range of useful diagnostic indicators of the bulk flow of material in a mass flow measuring device.

Preferably the said characteristic of the flow is substantially independent of the said coefficient of friction and may be the flow rate Q of bulk material on the sensor surface. Alternatively, the said characteristic may be dependent on the coefficient of friction between the bulk material and the surface. Examples of such characteristics include the average velocity $v_e$ of bulk material at an exit of the surface (i.e. the exit velocity); or the coefficient of friction $\mu$ between the bulk material and the surface.

The variety of possible quantities that are measurable confers considerable latitude on the design of a mass flow measuring apparatus according to the invention.

Particularly preferred forms of the apparatus include means for processing the outputs of the one or more transducers, whereby to generate a signal indicative of:

(i) the average exit velocity of the bulk material from the sensor member; or (ii) the mass flow rate of bulk material on the sensor member; or (iii) of the mass of bulk material present over a length of the sensor member at the exit thereof.

As indicated above, such signals are valuable diagnostic tools in operation of mass flow measuring apparatuses, and also may serve to improve the accuracy of mathematical models used to calculate the mass flow rate from the action of streamline flow of bulk material on a sensor member.

The exit velocity value changes as soon as changes arise in the inlet or entrance portion of the sensor member, and as soon as the bulk properties of the material change. Indeed, if the streamline flow process changes for any reason, the exit velocity changes in a manner that can be used to indicate the nature and/or magnitude of the process change.

In the case of mass flow measurement in a combine harvester the apparatus of the invention could as a result be employed to warn the vehicle operator of a drop in flow momentum that could result in plugging of the flow path.

Thus in some embodiments of the invention, in particular those involving simultaneous measurement of a force and a moment it is possible to use a sensor member that is not optimised with respect to changes in the value of the coefficient of friction referred to hereinabove. Under such circumstances, however, the length of the moment arm may be optimised in order to minimise the influence of changes in the coefficient of friction, without having specifically to design the sensor member and its mounting to achieve this effect.

Under such circumstances, the choice of the moment arm length and/or orientation depends on the angle of inclination of the sensor apparatus relative to a predetermined orientation. Clearly during use of vehicles such as harvesting machines, this angle of inclination will change, often somewhat rapidly. It therefore is desirable for some embodiments of apparatus according to the invention to include an inclinometer for detecting the inclination of the apparatus from a predetermined orientation, and processing means for modifying the outputs of the one or more transducers in dependence on the detected inclination of the apparatus.

Such an apparatus can therefore be made substantially insensitive to changes in the coefficient of friction value, and insensitive to changes in the orientation of the apparatus, without necessarily specifically designing the sensor member and its mounting to achieve this effect.

The measurement of two measurable quantities may also be employed to render independent of the mass of bulk material at a particular location the output of a transducer (such as but not limited to a moisture sensor or a protein sensor) that measures features of the bulk flow as it passes a chosen point in the flow path.

Embodiments of the invention may include a curved and/or a straight chute for establishing the streamline flow thereon of bulk material. Thus the apparatus of the invention is versatile.

The invention is also considered to reside in a harvesting machine including a mass flow measuring apparatus as defined above.

According to a second aspect of the invention, there is provided a method of measuring the mass flow of bulk material on a sensor member comprising the steps of:

establishing streamline flow of bulk material on the sensor member;

simultaneously measuring two measurable quantities resulting from forces acting on the sensor member;

generating signals dependent on the measured values of the said quantities; and processing the signals whereby to generate output values representing one or more of:

the mass flow rate of bulk material on the sensor member;

the average velocity of bulk material at an exit from the sensor member; and the mass of bulk material per unit length of the sensor member in the said exit zone thereof.

Conveniently the two measurable quantities are selected from the set of:

two force components acting on the sensor member in different directions;

two moments, resulting from one or more forces acting on the sensor member, about different points;

a moment, resulting from one or more forces acting on the sensor member, and a force component acting on the sensor member. When two mutually divergent force components are used, preferably the force components are mutually perpendicular.

The method of the invention may also include the substeps of detecting the inclination of the sensor member relative to a predetermined orientation, and modifying the or each output value in dependence on the detected inclination.

BRIEF DESCRIPTION OF THE DRAWINGS

The advantages of this invention will be apparent upon consideration of the following detailed disclosure of the invention, especially when taken in conjunction with the accompanying drawings wherein.

There now follows a description of preferred embodiments of the invention, by way of example, with reference being made to the accompanying drawings in which.

DETAILED DESCRIPTION OF THE INVENTION

Figure 1:
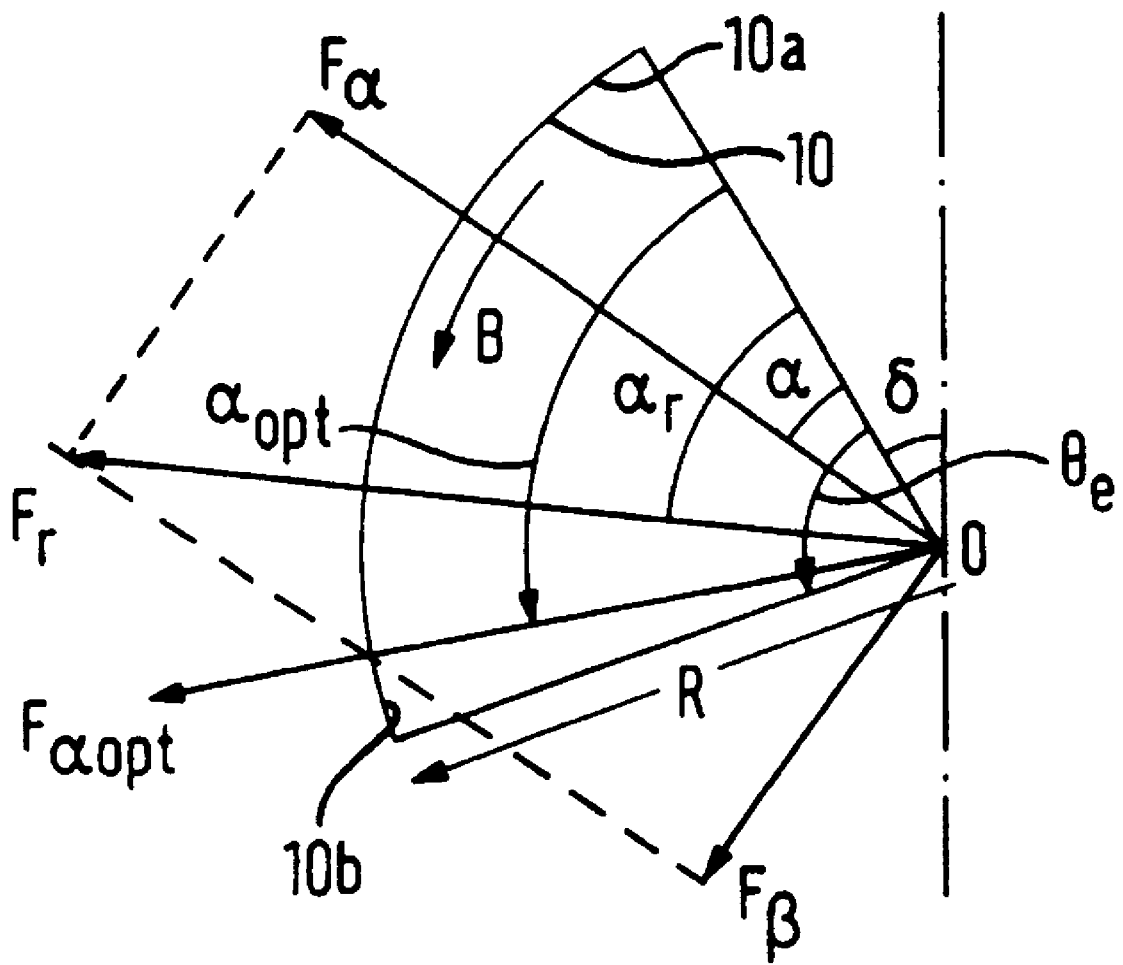
FIG. 1 is a schematic representation of forces acting on a sensor member having a circular curvature.

Referring to the drawings and in particular to FIG. 1, there is shown an analysis of forces acting on the sensor member 10 of a mass flow measuring apparatus such as that disclosed in patent application Ser. Nos. 09/005,094 and 09/005,095.

Sensor member 10 is a circular arc of radius R in profile, and includes an inlet region 10a at its upper end. Member 10 also includes an exit zone 10b at its lower end. In practice, streamline flow of bulk material on sensor member 10 may be established by feeding bulk material along a further member (not shown in FIG. 1) substantially tangential to and closely adjacent inlet portion 10a.

A normal to inlet portion 10a is inclined at an angle δ to the vertical in the installation represented in FIG. 1. The angular length of the sensor member 10 is denoted by $\theta_e$; the average velocity of bulk material at inlet portion 10a by $v_o$; and the average velocity of bulk material at the exit zone 10b by $v_e$.

The result of bulk flow of material such as grains of crop acting on sensor member 10 may be considered as a resultant force $F_r$ acting in a direction defined by the angle $\alpha_r$ measured from the normal to the inlet portion 10a.

Force $F_r$ may be resolved into two preferably mutually perpendicular components $F_\alpha$ (acting in a direction defined by angle α from the normal to inlet portion 10a) and $F_\beta$ (acting as right angles thereto).

The continuous and simultaneous measurement of two forces permits a friction-independent determination of the mass flow rate value Q, from which it is possible to derive the average exit velocity $v_e$ according to the methods described below:

As described in our copending application Ser. Nos. 09/005,094 and 09/005,095, there is a direction $\alpha_{opt}$ (FIG. 1) for which the influence of friction variation on the force measurement is minimal. The friction-independent force component $F_{\alpha opt}$ may be derived from the two forces $F_\alpha$ and $F_\beta$, measured in two preferably, but not necessarily, perpendicular directions α and β. $F_{\alpha opt}$ can be calculated from:

$$F_{\alpha opt}=F_r \bullet \cos(\alpha_{opt}-\alpha_r) \tag{1}$$

When directions α and β are perpendicular to each other, $\alpha_r$ and $F_r$ may be calculated from:

$$\alpha_r=\alpha+\arctan(F_\beta/F_\alpha) \tag{2}$$

and $$F^2_r=F^2_\alpha+F^2_\beta \tag{3}$$

$F_\alpha$ and $F_\beta$ are derived from the two force measurements simultaneously carried out during use of the apparatus and the direction $\alpha_{opt}$ is a fixed installation-dependent parameter.

The resulting force $F_{\alpha opt}$ is proportional to $Q.v_o$ and can be used for determining the mass flow rate Q.

In case α and β are not perpendicular, other well known trigonometric formulae can be used for determining $\alpha_r$ and $F_r$ from the two measured forces.

The force $F_{\alpha\beta}$ (i.e. the combination of two forces $F_\alpha$ and $F_\beta$) is defined as:

$$F_{\alpha\beta}=F_\alpha \bullet \cos(\delta+\beta)-F_\beta \bullet \cos(\delta+\alpha) \qquad (4)$$

friction-independent mass flow measurement can be obtained via another calculation method within the scope of the invention if:

$$\theta_e+\delta=90° \qquad (5)$$

In this case the combined force $F_{\alpha\beta}$, as defined in equation (4) is proportional to the mass flow rate:

$$F_{\alpha\beta}=Q \bullet v_o \bullet \cos\delta \bullet \sin(\alpha-\beta) \qquad (6)$$

This formula does not contain any friction-dependent variables and hence can be used for calculating the Q rate.

In this embodiment of the method of the invention it is not required that directions α and β be perpendicular. This is shown schematically in FIG. 1a, which includes the non-perpendicular force values $F_\alpha$ and $F_\beta$.

Figure 2:
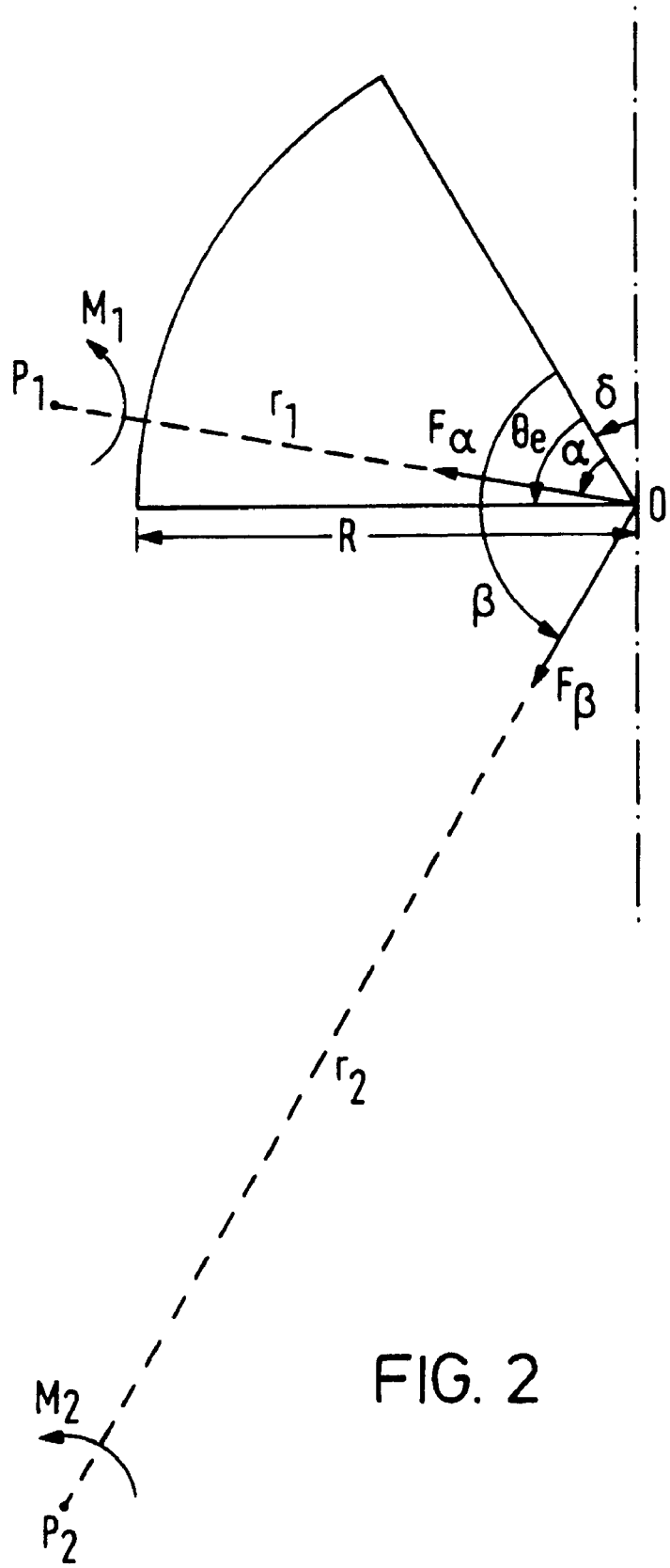
FIG. 2 is a view similar to FIG. 1 showing schematically the use of two forces $F_\alpha$ and $F_\beta$; and in alternative embodiment illustrated in FIG. 1a for convenience, the use of two moments $M_1$, $M_2$ in the measurement of bulk flow according to the invention.
Figure 3:
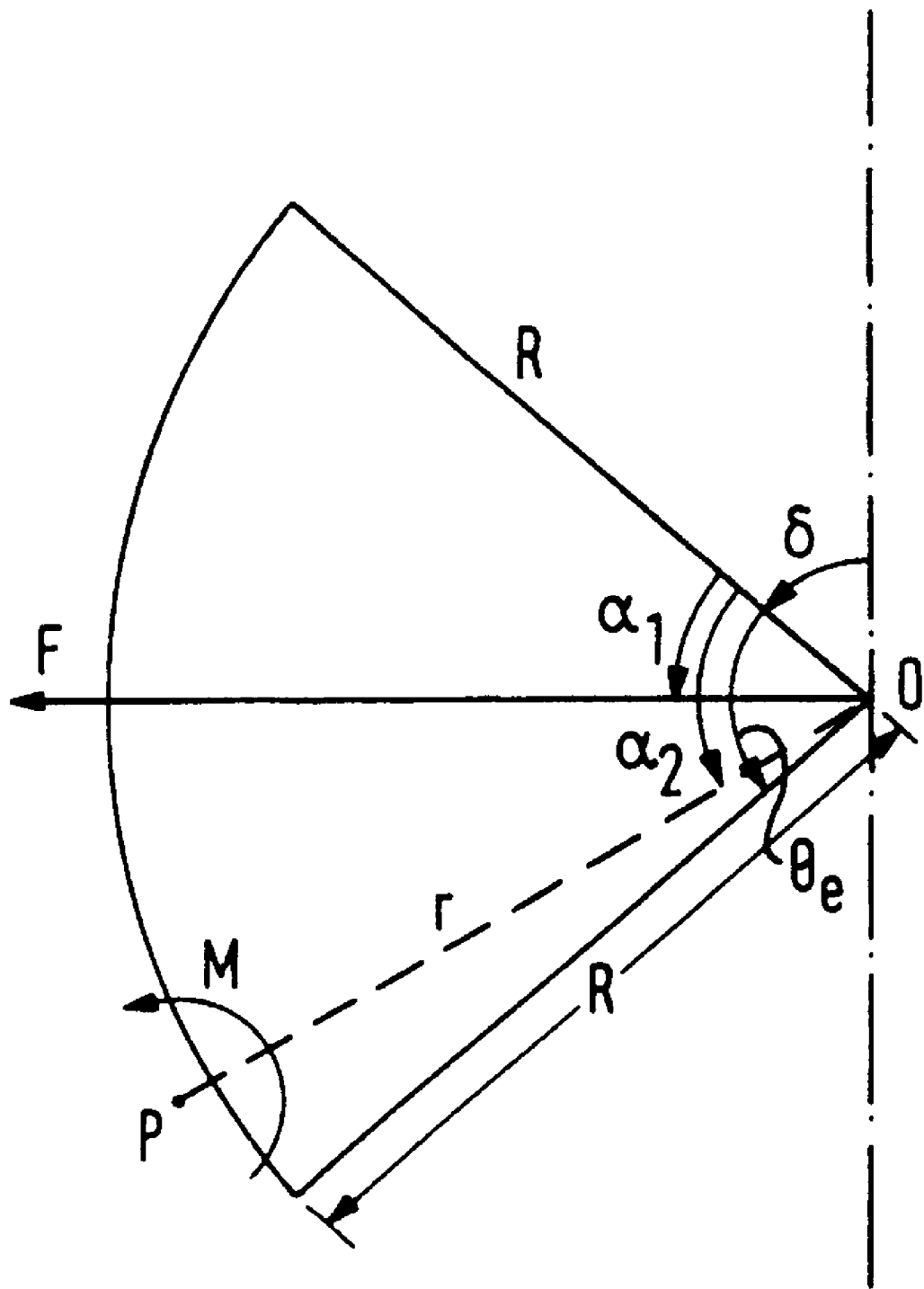
FIG. 3 is a view similar to FIG. 1 showing a further embodiment of the invention in which a moment M and a force F are used to obtain a substantially friction-independent measurement of the mass flow rate Q.

Another possibility involves measurement of two moments $M_1$, $M_2$ about distinct points represented in polar co-ordinates by $(\alpha,r_1)$, $(\beta,r_2)$ for deriving a friction-independent mass flow quantity. $r_1$ and $r_2$ represent the radial distances of the respective points about which the moments act from the point O in FIG. 2.

Herein the subtraction of the measured quantities is no longer dependent upon variations of μ if the following conditions are met:

1) $r_1/r_2=\sin(\beta+\delta)/\sin(\alpha+\delta) \qquad (7)$ and

2) $\theta_e+\delta=90° \qquad (8)$

Then the moment difference is equal to:

$$M_1-M_2=Q \bullet v_o \bullet (r_2 \bullet \cos\beta - r_1 \bullet \cos\alpha) \qquad (9)$$

from which the value of Q may be found. FIG. 1a additionally shows, schematically, the two moments $M_1$, $M_2$. In general the applicants expect the use of two moments $M_1$, $M_2$ to be practised independently of the use of the forces $F_\alpha$, $F_\beta$ also shown, for convenience, in FIG. 2.

Substantial elimination of friction, influences on the mass flow measurement can also result from the combination of force and moment measurement. This is shown schematically in FIG. 1b.

The force F is measured in a direction $\alpha_1$ and the pivot for moment measurement is located at polar co-ordinate $(\alpha_2,r)$.

A first condition is that the inclination angle be equal to:

$$\delta=90°-(\theta_e/2) \qquad (10)$$

A second condition is that r/R be equal to:

$$R_i = \frac{\cos(\delta+\alpha_1)-(G_1/G)\cdot\sin(\theta_e-\alpha_1)}{\cos(\theta_e-\alpha_2)\cdot\cos(\delta+\alpha_1)-\sin(\delta+\alpha_2)\cdot\sin(\theta_e-\alpha_1)} \qquad (11)$$

in which:

$$G = Q \cdot g \cdot R \cdot \int_o^{\theta_e} \frac{d\theta}{v} \qquad (12)$$

and $$G_1 = Q \cdot g \cdot R \cdot \int_o^{\theta_e} \frac{\sin(\delta+\theta)\cdot d\theta}{v} \qquad (13)$$

Then Q can be derived from:

$$Q \cdot v_o = \frac{F \cdot R \cdot S + M \cdot \cos(\delta+\alpha_1)}{R \cdot S \cdot \sin\alpha_1 + (R-r\cdot\cos\alpha_2)\cdot\cos(\delta+\alpha_1)} \qquad (14)$$

wherein S is a dimensionless value.

No exact friction elimination can be obtained if condition (10) has not been met, but slight deviations in the order of $\delta_i \pm 15$ will still yield acceptable results. Since under normal circumstances the orientation of a harvesting machine does not deviate in use from its mean orientation by more than ±15, this method for determining Q is suitable for such mobile installations.

For all the above-described embodiments of the method of the invention, it is in any event possible to combine the results of the force or moment sensors with an inclinometer to correct for inclination-related force variations.

Once Q is known (e.g. through use of one of the above described methods according to the invention), the exit velocity $v_e$ can be derived from two force measurements:

$$\frac{v_e}{v_o} = \left(\frac{F_\alpha \cdot \cos(\delta+\beta)-F_\beta \cdot \cos(\delta+\alpha)}{Q \cdot v_o \cdot \sin(\alpha-\beta)}-\cos\delta\right)\cdot\frac{1}{\cos(\theta_e+\delta)} \qquad (15)$$

The directions α and β need not be mutually perpendicular.

However to optimize the measurement of a friction-dependent parameter such as $v_e$, it is most advantageous to choose $$\alpha=\alpha_{opt} \qquad (16)$$

and $$\beta=\alpha\pm90° \qquad (17)$$

Then $v_e$ can be derived from:

$$\frac{v_e}{v_o} = \frac{F_\alpha \cdot \sin(\delta+\alpha_{opt})+F_\beta \cdot \cos(\delta+\alpha_{opt})-Q \cdot v_o \cdot \cos\delta}{Q \cdot v_o \cdot \cos(\theta_e+\delta)} \qquad (18)$$

The velocity ratio can alternatively be derived in accordance with the method of the invention from two moment measurements. When condition (7) above is fulfilled and condition (8) is not, the velocity ratio can be derived from:

$$\frac{v_e}{v_o} = \frac{(M_2-M_1)\cdot\sin(\beta+\delta)+Q\cdot v_0 \cdot r_1 \cdot \cos\delta \cdot \sin(\alpha-\beta)}{Q \cdot v_0 \cdot r_1 \cdot \sin(\alpha-\beta)\cdot\cos(\delta+\theta_e)} \qquad (19)$$

Q may be derived directly from the output of a moment transducer when it is arranged to measure the moment about a pivot optimised with respect to the influence of changes in μ.

According to a further embodiment of the method according to the invention, the velocity ratio can also be derived from the measurement of a force and a moment.

Alternatively, the force may be measured in a chosen direction $\alpha_1$:

$$\alpha_1 = 90° - \delta \quad (20)$$

Then the velocity $v_e$ may be calculated from:

$$\frac{v_e}{v_o} = \frac{F - v_o \cdot Q \cdot \sin\alpha_1}{v_o \cdot Q \cdot \sin(\theta_e - \alpha_1)} \quad (21)$$

The mass of bulk material per unit length at the exit of the curved surface may be derived from Q and $v_e$:

$$\frac{dm}{R \cdot d\theta} = \frac{Q}{v_e} \quad (22)$$

These mass data can be used for adjusting of the output of devices which measure properties of the bulk material and which are installed at or immediately behind the surface outlet 10b.

Such devices may in accordance with the invention include moisture sensors. Most known moisture sensors are of the capacitive or of the resistive type, measuring the capacitance of a layer of grain material between two plates or the resistance of this layer between two stationary plates along the crop path.

Such devices may in accordance with the invention also include devices for measuring the protein content of the crop material. The outputs of such transducers are proportional to the mass of bulk material present at the sensor location. The ability to determine the mass per unit length acting at the exit portion 10b permits compensation of the moisture sensor transducer signal in the event of changes in the mass per unit length value.

In the above analyses, $v_o$ is derivable from installation parameters, such as conveyor speed, or independent measurements, for example using a radar Doppler speed sensor measuring the speed of bulk material in the member tangential to inlet portion 10a.

The value of the exit velocity $v_e$ changes as soon as the flow process conditions change for any reason. Thus if the value of $v_e$ is calculated e.g. in a processor for processing signals derived from transducers measuring the force components $F_\alpha$ and $F_\beta$, it is possible for example to provide a visible or audible warning signal to the operator of a harvesting vehicle to indicate that a change has occurred in the bulk properties of the material.

A specific example of this concept is the provision of a warning to the vehicle operator of a drop in the flow momentum that could result in plugging of the flow path. The vehicle processor could be programmed with a preset level of the exit velocity value $v_e$. If the exit velocity value $v_e$ drops below the preset value, a warning could be made.

The value of $v_e$ is strongly related to the effects of friction in the sensor member 10.

The principles set out herein are equally applicable to stationary bulk transport systems such as hoppers, silos and conveyors.

The simultaneous measurement of two forces in the sensor member 10 may be used to improve the theoretical model of mass flow of bulk material in the sensor member 10 if the flow at the inlet portion 10a is substantially steady state.

It is also possible to specify an optimum value $R_i$ of the moment arm that, in conjunction with mean value of $\delta_i$, renders the mass flow rate figure substantially independent of friction coefficient changes.

Furthermore, as indicated it is possible install an inclinometer to correct for deviations of the inlet angle $\delta$ from the preferred value $\delta_1$.

The foregoing mathematical models may be modified for use in relation to sensor members 10 that are substantially straight, or indeed are combinations of curved and straight members. In such cases it is again possible to derive values for e.g. the average exit velocity $v_e$ and the mass per unit length of bulk material in the exit zone 10b from the flow rate Q.

Figure 4:
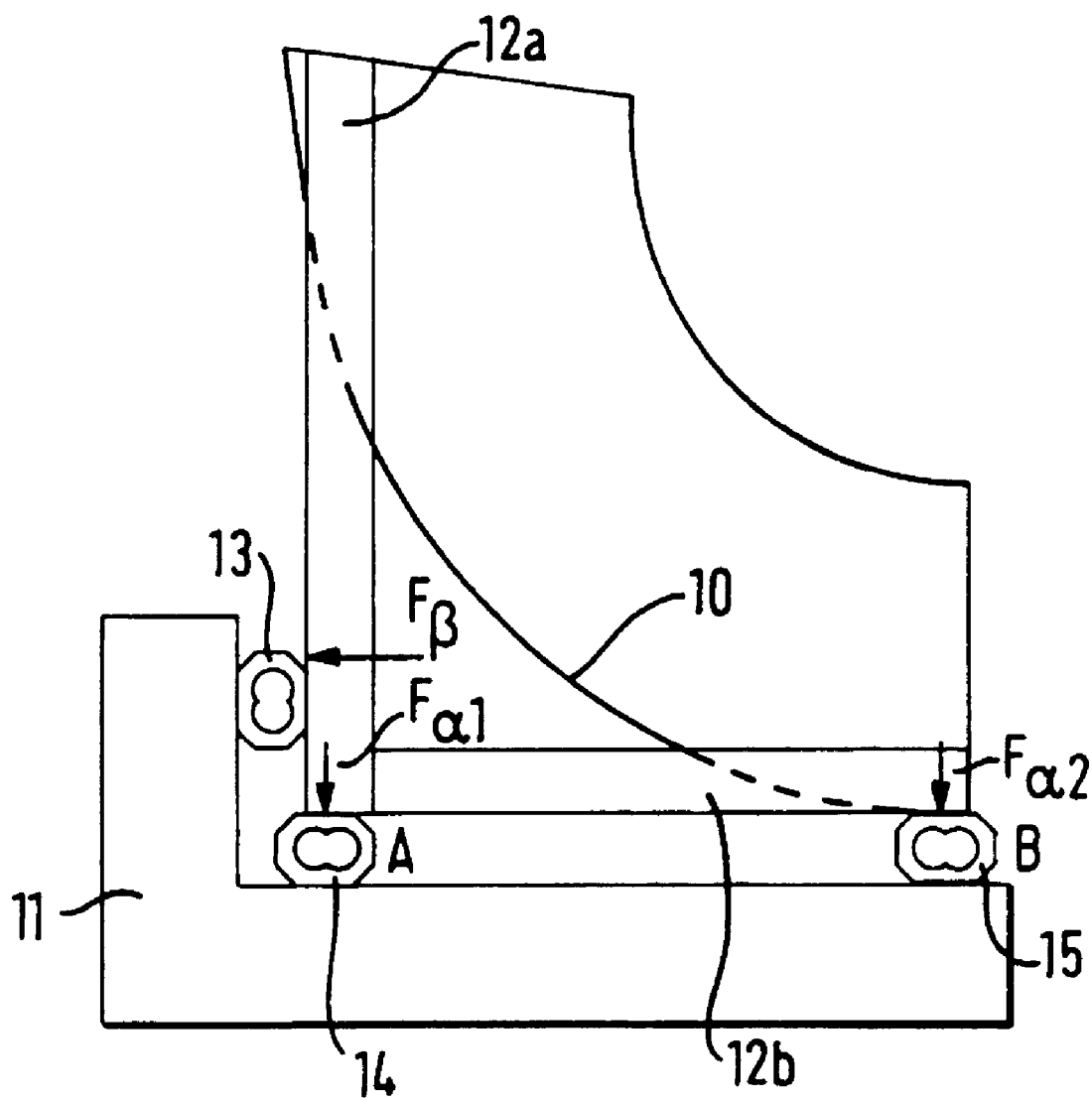
FIG. 4 shows schematically a first embodiment of apparatus according to the invention.

Referring now to FIG. 4, there is shown a sensor member 10 in the form of a circular arc secured in a mounting frame 11 by means of a support framework comprising orthogonal members 12a and 12b. Members 12a and 12b are spaced from mounting frame 11 by means of respective ring dynamometers 13, 14 and 15 each of a per se known design.

As is evident from FIG. 4, dynamometer 13 is disposed generally vertically, whereby to measure the force component $F_\beta$ acting horizontally between the member 12a and support frame 11.

Dynamometers 14 and 15 are as shown disposed horizontally and therefore measure the force components $F_{\alpha 1}$ and $F_2$ that between them constitute the force $F_\alpha$, determined by the relationship $F_\alpha = F_1 + F_{\alpha 2}$.

Thus the FIG. 4 embodiment of the invention permits simultaneous measurement of two forces ($F_\alpha$ and $F_\beta$) acting on the sensor member 10 in different (in this case mutually orthogonal) directions, from which may be derived e.g. the values of Q or $v_e$, or any of the other diagnostic values described.

Also, since the force component F itself consists of two components ($F_{\alpha 1}$ and $F_{\alpha 2}$), it is possible to determine the moment M about the point of application of force $F_{\alpha 2}$ on ring dynamometer 15, from the measured values of $F_{\alpha 1}$ and $F_\beta$. Thus the apparatus of FIG. 4 is also suitable for simultaneous measurement of a force and a moment in the manner described herein.

Figure 5:
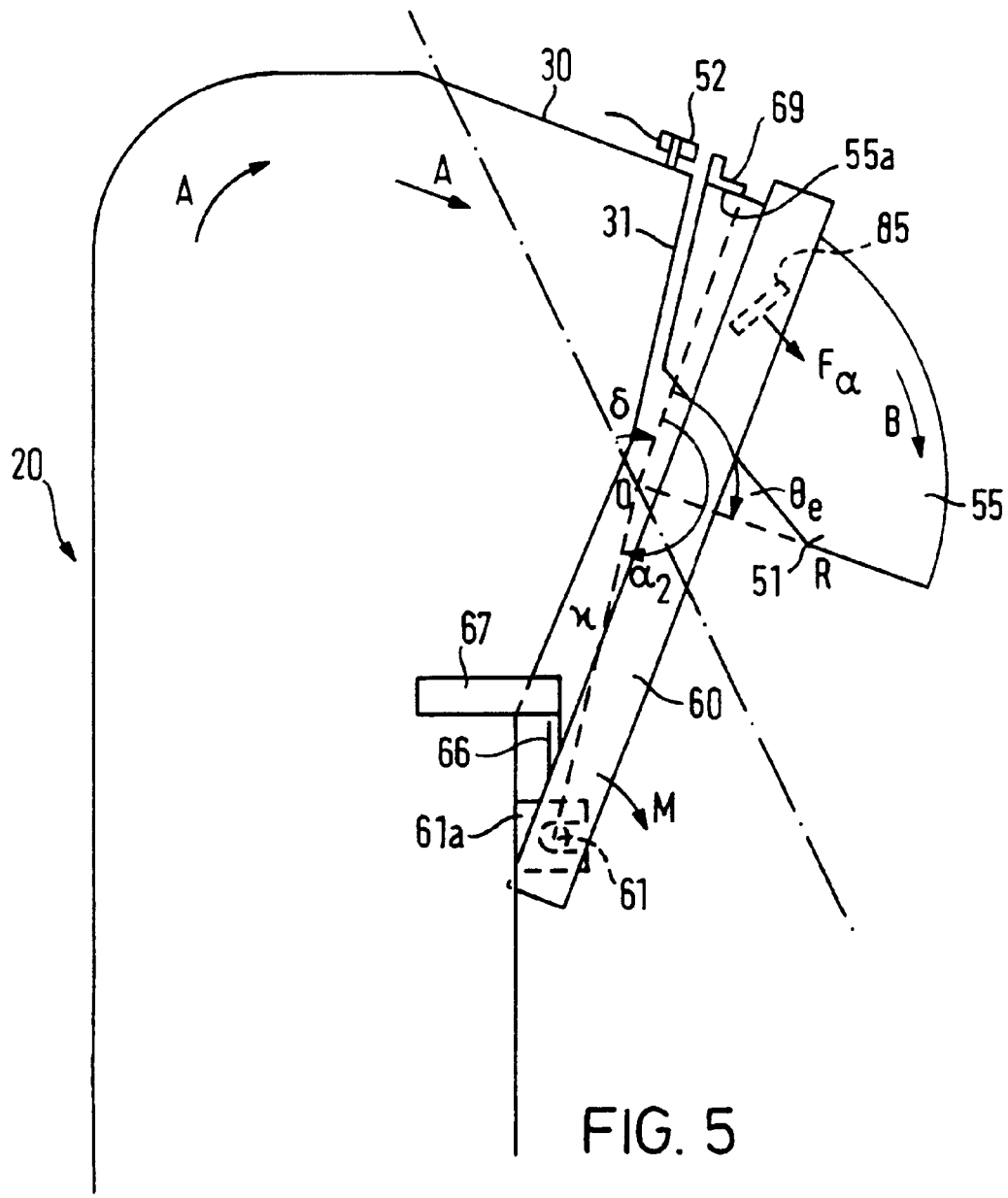
FIGS. 5 and 6 are, respectively, side and end elevational views of a second embodiment of apparatus according to the invention.
Figure 6:
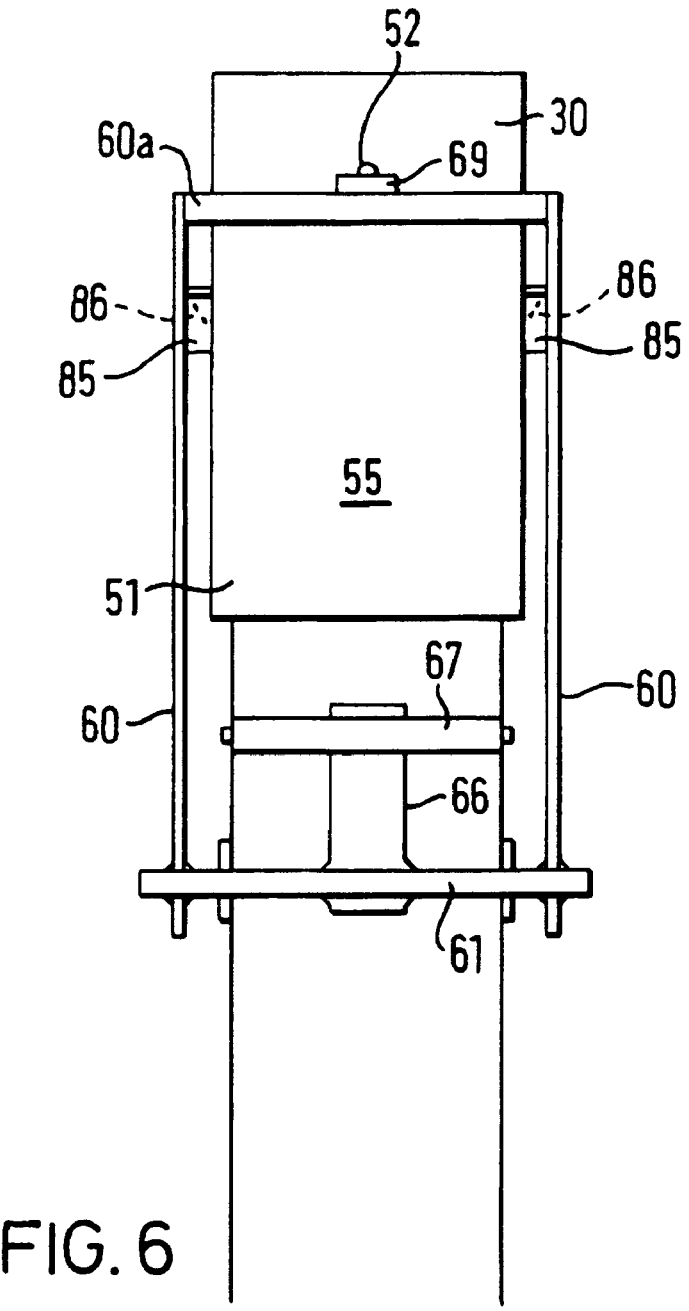
Figure 7:
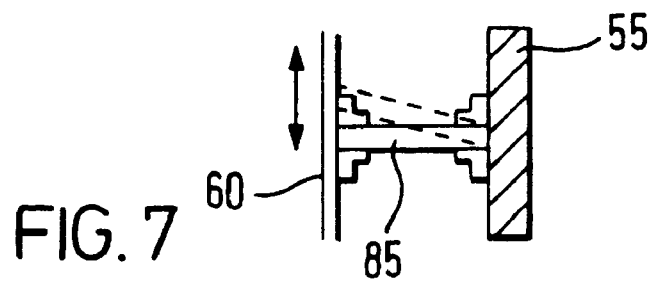
FIG. 7 shows a typical strain gauge mounting in the embodiment of FIGS. 5 and 6.

Referring to FIGS. 5 to 7, there is shown a practical embodiment of a mass flow measuring apparatus according to the invention.

In FIGS. 5 to 7 a grain elevator 20 of a combine harvester is shown in outline only.

Grain elevator 20 comprises a hollow housing, within which is disposed a series of paddles that elevate grain from the cleaning mechanism of the combine harvester to the bottom of the bubble up auger. The paddles repeatedly throw portions of grain in the direction of the arrows A of FIG. 5 within the housing.

The housing comprises a planar portion 30 that is adjacent an outlet 31. Planar portion 30 lies adjacent and tangential to the inlet portion 55a of an arcuate sensor member 51 in the form of a chute. Inlet portion 55a is not accounted for in the formulae herein since in general the bulk flow does not contact it, at least when the apparatus is used adjacent a grain elevator as shown.

Sensor member 51 is supported for pivoting movement about an axis 61 by means of a pair of support arms 60 extending inclinedly downwardly to either side of the side walls 55 of sensor member 51.

The pivot axis of sensor member 51 is constituted as a pivot pin 61 in the embodiment of FIGS. 5 and 6. The support arms 60 are secured to pivot pin 61, that is rotatably mounted in a yoke 61a. The support arms 60 are joined at their upper ends, across the top of the sensor member 51, by a plate member 60a.

The side walls 55 of sensor member 51 are secured to the respective arms 60 by arrangements such as shown in FIG. 7.

In FIG. 7, a leaf spring 85 flexibly interconnects each side wall 55 and the adjacent arm 60. Thus is permitted relative longitudinal movement in the direction of $F_\alpha$ between each arm 60 and the side wall 55, as indicated schematically by the arrow in FIG. 7.

Each leaf spring 85 has operatively associated therewith a strain gauge 86 shown schematically in FIG. 6. Thus it is possible to measure forces acting on the sensor member 51 in the direction of arrow $F_\alpha$. The leaf spring 85 of FIG. 6, and hence the direction of $F_\alpha$, are schematically inclined so as to satisfy equations (10) and (11) herein.

FIG. 6 also shows the direction of the vertical by means of a chain line.

Thus the apparatus of FIGS. 5 to 7 may be employed to measure a force acting on the sensor member 51 and a moment acting about the axis 61 while streamline flow of bulk material is established on the inner surface of member 51 as indicated by the arrow B in FIG. 5.

A displacement sensor 52, 69 may be employed to measure the displacement of the sensor member 51 from the exit 31, thereby providing an indication of the moment acting on the sensor member 51.

Arms 60 are affixed to pivot axle 61 and a leaf spring 66 which is also affixed to the axle 61 holds the arms and the sensor member in balance. The upper portion of the spring is held in place by bracket 67. The moment M is measured by the sensor 52.

The exemplary installation parameters shown in FIGS. 6 and 7 are: $\delta=45°$, $\theta_e=90°$, $\alpha_1=120°$, $\alpha_2=172°$ and $r/R=1.185$.

Other installation parameters may of course be used if desired.

Displacement sensor 52, 69 may operate according to a number of known principles, for example inductive sensing; optical emitter-receiver principles; radar; or sonar.

Thus, in broad terms, the method of use of the invention involves simultaneous measurement of two mechanical quantities (such as two forces; two moments; or one or more forces plus a moment), in order to provide a calculation of a friction independent characteristic e.g. the bulk flow rate Q; and to derive therefrom a friction-dependent characteristic, e.g. the value of $v_e$.

What is claimed is:

1. A mass flow measuring apparatus comprising a sensor member including a surface for establishment thereon of streamline flow of bulk material; comprising a transducer for measuring at least two measurable quantities resulting from a force acting on the sensor member wherein the said characteristic of the flow is substantially independent of the said coefficient of friction, wherein the measurable quantities are forces acting on the sensor member in different directions and the apparatus said transducer for measuring at least two measurable quantities, including at least one transducer for measuring at least two moments resulting from at least one force acting on the sensor member, about different points said forces comprising the force resulting from said streamline flow on the sensor; and a processor for deriving from the transducer outputs one or more characteristics of the flow of bulk material on the surface, said one or more characteristics being optionally substantially independent of the coefficient of friction between the bulk material and the surface; or dependent thereon, wherein the length and orientation of the moment arm is selected so as to minimise the influence of changes in the friction coefficient, between the bulk material and the surface of the sensor member, on the mass flow rate.

2. The apparatus according to claim 1, including at least one transducer, for measuring a moment, resulting from at least one force acting on the sensor member.

3. The apparatus according to claim 2, including at least one transducer for measuring two force components, acting on the sensor member in different directions, and a moment, resulting from at least one force acting on the sensor member.

4. The apparatus according to claim 3, wherein the processor derives the mass flow rate signal from a single quantity determined with respect to an installation parameter of the apparatus optimised to minimise the effects of changes in the said coefficient of friction on the said single quantity.

5. The apparatus according to claim 4, wherein the said installation parameter is the direction in which a force component, resulting from flow of bulk material on the surface, is measured.

6. An apparatus according to claim 4, wherein the said installation parameter is the point about which a moment is measured.

7. The apparatus according to claim 6, wherein the processor derives the mass flow rate signal from a combination of two measurable quantities each dependent on changes in the coefficient of friction between the bulk material and the said surface, the combination being such that the mass flow rate signal is independent of changes in the said coefficient of friction.

8. An apparatus according to claim 7, wherein the two measurable quantities are force components measured in different directions.

9. A mass flow measuring apparatus according to claim 1, wherein the said characteristic of the flow is dependent on the coefficient of friction between the bulk material and the surface.

10. The apparatus according to claim 9, wherein the processor derives the said flow characteristic from a combination of one or more measurable quantities and a mass flow rate of bulk material on the said surface.

11. The apparatus according to claim 10, wherein the processor generates a flow characteristic signal indicative of the average exit velocity of bulk material from the sensor member.

12. The apparatus according to claim 11, wherein the processor generates a flow characteristic signal indicative of the mass of bulk material present over a length of the sensor member at the exit thereof.

13. The apparatus according to claim 12, including means for modifying the output of a flow monitoring device in dependence on the said flow characteristic.

14. The apparatus according to claim 12, wherein the flow monitoring device is a moisture sensor or a protein sensor.

15. The apparatus according to claim 14, wherein the flow monitoring device is on or close to the surface, at or adjacent its exit.

16. The apparatus according to claims 15, wherein the processor generates a warning signal in the event of the flow characteristic signal attaining a predetermined value.

17. The apparatus according to claim 16, wherein the predetermined value corresponds to a low exit velocity value or a high value of the mass of bulk material per unit length at the exit of the sensor, corresponding to plugging of the bulk flow.

18. The apparatus according to claim 17, including an inclinometer for detecting the inclination of the apparatus from a predetermined orientation and processing means for modifying the outputs of the one or more transducers in dependence on the detected inclination of the apparatus.

19. The apparatus according to claim 18, wherein the sensor member includes a curved chute.

20. The apparatus according to claim 19, wherein the sensor member includes a generally straight chute.

21. A harvesting machine including a mass flow measuring apparatus according to claim 20.

22. A method of measuring the mass flow of bulk material on a sensor member, comprising the steps of:

establishing streamline flow of bulk material on the sensor member;

simultaneously measuring two measurable quantities resulting from forces acting on the sensor member, said two measurable quantities are moments, resulting from one or more forces acting on the sensor member, about different points, said measurable quantities further comprising two force components, acting on the sensor member in different directions; and a moment resulting from one or more forces acting on the sensor member, said forces comprising the force resulting from said streamline flow on the sensor:

generating signals dependent on the measured values of the said quantities; and processing the signals whereby to generate output values representing one or more of:

the mass flow rate of bulk material on the sensor member;

the average velocity of bulk material at an exit from the sensor member; and the mass of bulk material per unit length of the sensor member in the said exit zone thereof, wherein the mass flow rate signal is derived from a single quantity determined with respect to an installation parameter of the apparatus optimised to minimise the effects of changes in the said coefficient of friction on the said single quantity, said installation parameter is the point about which a moment is measured.

23. The method according to claim 22, wherein the two measurable quantities are two force components acting on the sensor member in different directions.

24. The method according to claim 22, wherein the two force components are mutually perpendicular.

25. The method according to claim 22, wherein the measurable quantities are a moment, resulting from one or more forces acting on the sensor member; and a force acting on the sensor member.

26. The method according to claim 22, wherein the said installation parameter is the direction in which a force component, resulting from flow of bulk material on the surface, is measured.

27. The method according to claim 22, including the sub-steps of deriving the mass flow rate signal from a combination of two measurable quantities each dependent on changes in the coefficient of friction between the bulk material and the said surface, the combination being such that the mass flow rate signal is independent of changes in the said coefficient of friction.

28. The method according to claim 27, wherein the two measurable quantities are force components acting in different directions.

29. The method according to claim 28, including the sub-step of deriving the flow characteristic from a combination of one or more measurable quantities and a mass flow rate of bulk material on the said surface.

30. The method according to claim 29, including the further step of supplying the flow characteristic signal to a flow monitoring device.

31. The method according to claim 30, wherein the flow monitoring device is a moisture sensor or a protein sensor.

32. The method according to of claim 31, including the further step of generating a warning signal in the event of the flow characteristic signal attaining a predetermined value.

33. The method according to claim 32, wherein the predetermined value corresponds to a low exit velocity value or a high value of the mass of bulk material per unit length at the exit of the sensor, corresponding to plugging of the bulk flow.

34. The method according to claim 33, including the sub-steps of detecting the inclination of the sensor member relative to a predetermined orientation, and modifying the or each output value in dependence on the detected inclination.

* * * * *